United States Patent
Kincheloe

[11] Patent Number: 5,970,788
[45] Date of Patent: Oct. 26, 1999

[54] RAIN DEFLECTOR

[76] Inventor: John M. Kincheloe, 210 Moll Dr., Windsor, Calif. 95492

[21] Appl. No.: 09/104,556
[22] Filed: Jun. 25, 1998
[51] Int. Cl.⁶ .................................................. G01W 1/00
[52] U.S. Cl. ........................................................ 73/170.21
[58] Field of Search ........................... 73/170.17, 170.21, 73/170.23

[56] References Cited

U.S. PATENT DOCUMENTS

| | | | |
|---|---|---|---|
| 764,315 | 7/1904 | Tomhas | 73/170.17 |
| 916,060 | 3/1909 | Thomson | 73/170.17 |
| 2,384,954 | 9/1945 | Moore | 73/170.17 |
| 2,570,710 | 10/1951 | Quinteros | 73/170.17 |
| 2,935,872 | 5/1960 | Misner | 73/170.21 X |
| 3,039,304 | 6/1962 | Myers | 73/170.17 |
| 3,826,135 | 7/1974 | Hollmann | 73/170.17 X |
| 4,578,995 | 4/1986 | Meyer | 73/170.17 |
| 4,665,744 | 5/1987 | Smith | 73/170.17 |
| 4,895,022 | 1/1990 | Noren | 73/170.17 X |
| 5,291,779 | 3/1994 | Govoni et al. | 73/170.17 |
| 5,531,114 | 7/1996 | Frager | 73/170.17 |
| 5,571,963 | 11/1996 | Balchin et al. | 73/170.21 |

FOREIGN PATENT DOCUMENTS

| | | |
|---|---|---|
| 606170 | 11/1934 | Germany . |
| 245407 | 6/1969 | U.S.S.R. . |

Primary Examiner—Elizabeth L. Dougherty
Attorney, Agent, or Firm—Colin P. Abrahams

[57] ABSTRACT

A rain deflector for use with a rain gauge comprises a base portion, at least one arm portion having an axis and extending upwardly from the base portion, and attachment means whereby the deflector can be secured to a rain gauge. The arm portion provides an obstruction to rain falling in a direction at an angle to the axis of the arm portion and deposits the rain obstructed into the rain gauge to thereby compensate for rain which would not otherwise be captured in the rain gauge as a result of the direction of the rainfall.

22 Claims, 4 Drawing Sheets

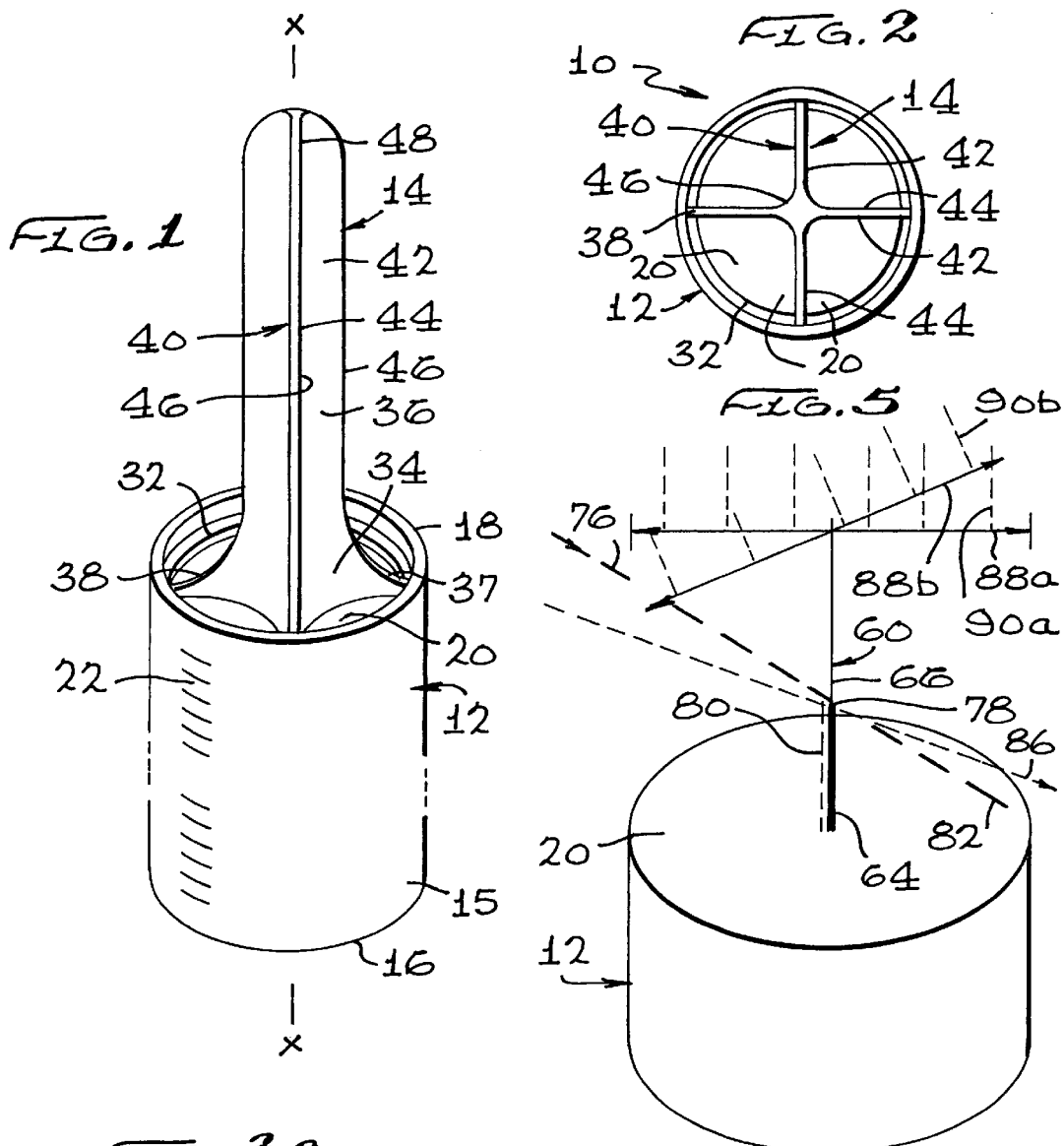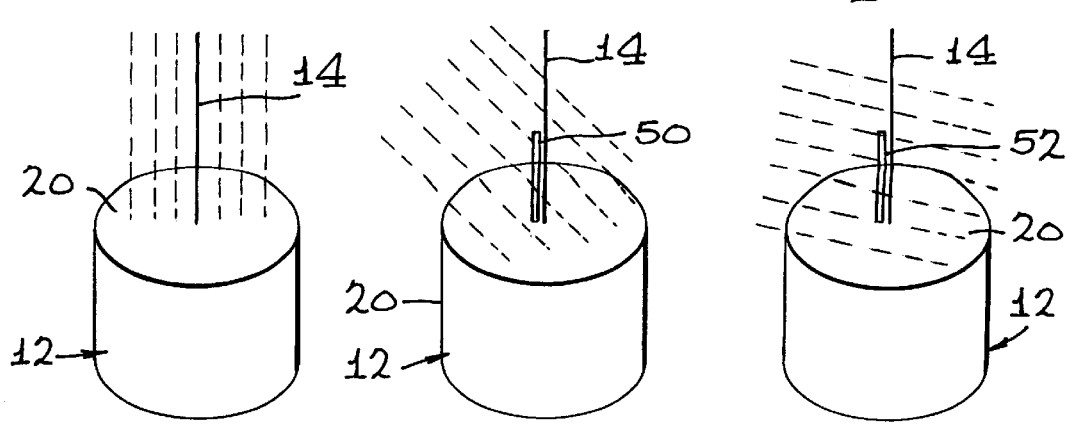

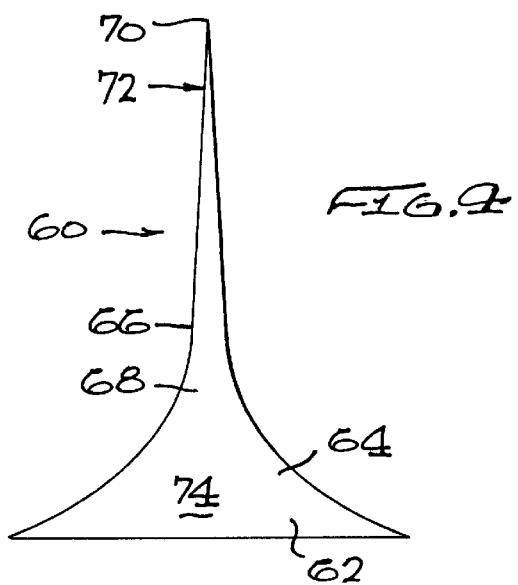
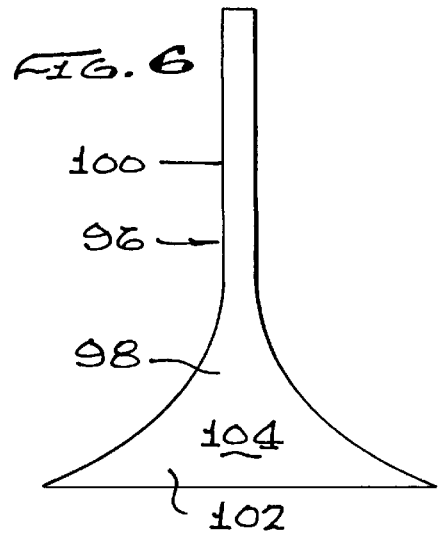
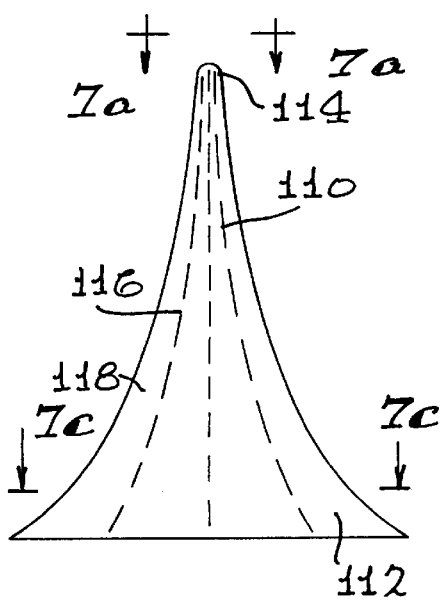
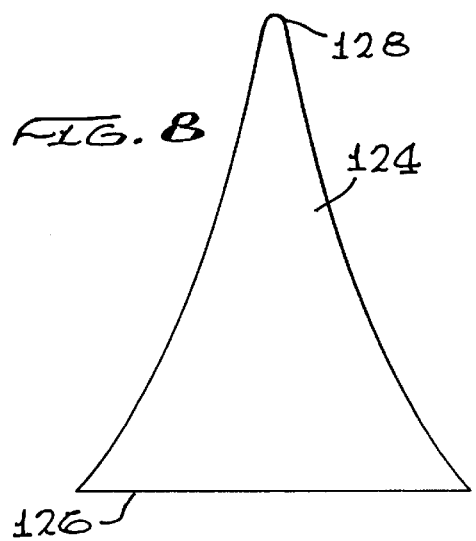
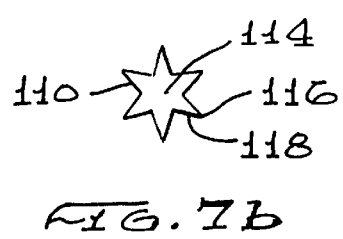
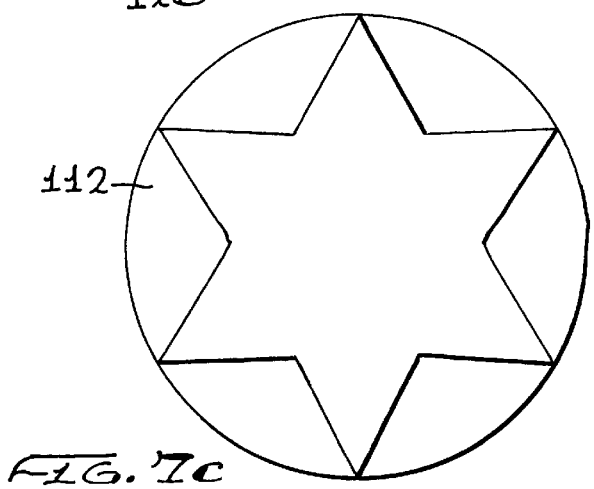

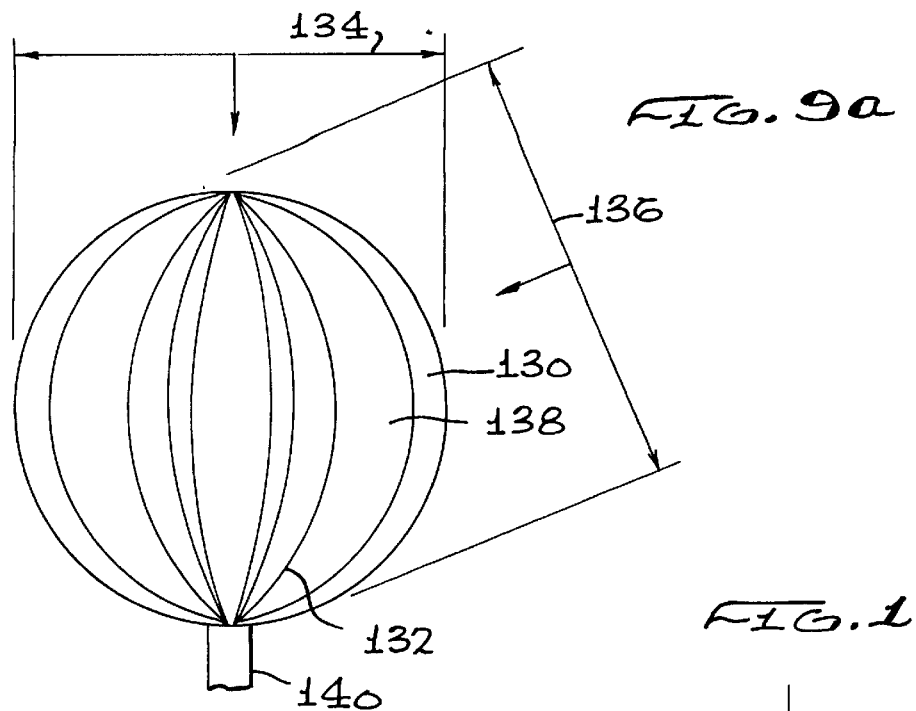
FIG. 9a
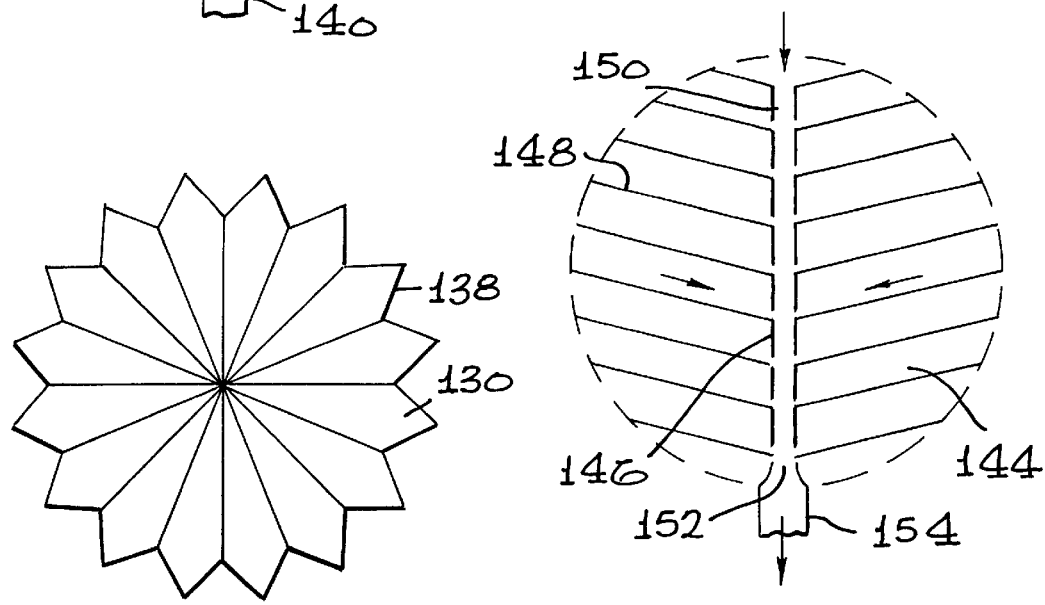
FIG. 10a
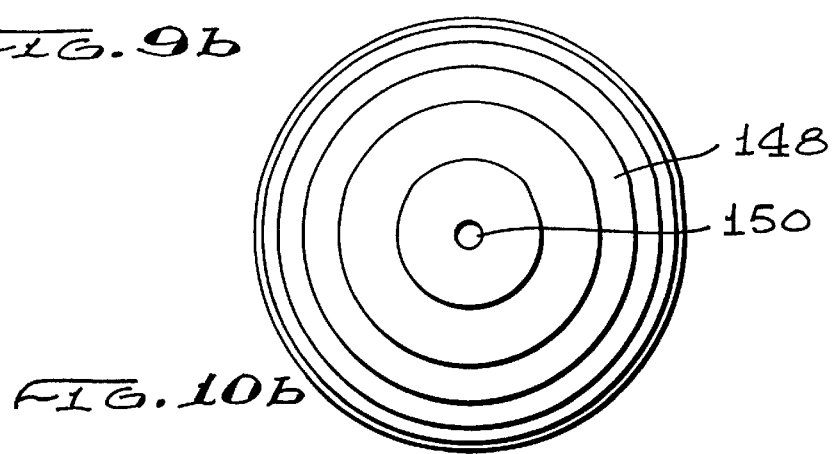
FIG. 9b
FIG. 10b

RAIN DEFLECTOR

FIELD AND BACKGROUND OF THE INVENTION

This invention relates deflectors for use with rain gauges, or rain gauges with deflectors used for enhanced and more accurate measurement of rainfall.

Rain gauges are common instruments for measuring the extent of rainfall, and come in a variety of shapes and sizes. For example, one form of rain gauge may comprise a hollow conically-shaped housing, open at its wide end which faces upwardly to collect the rain, with calibrated indications down the length of the gauge to facilitate easy reading of the amount of precipitation. One advantage of a conical shaped structure with a wide open end and a pointed lower end is that the larger surface area will be exposed to rain and therefore, based on the size of the rain gauge, capture more water as well as provide a broader indication of the amount of rain. However, cylindrical or other shaped rain gauges are equally effective and in common use.

Existing rain gauges have, of course, fixed surface areas for admitting rain, and would usually be constructed with calibration markings down the side; these calibration markings are based on rain falling about parallel to the axis of the rain gauge, usually vertically, also at about 90° to the horizontal. These existing rain gauges would, therefore, be reasonably accurate for rain falling vertically, but as the direction of rain changes with respect to the vertical, the amount of water being captured by admission through an open aperture at the top of the rain gauge would decrease. As an extreme, if rain were falling at an angle approaching the horizontal, very little or no rain would pass through the aperture into the rain gauge and the rain gauge would indicate no or very little rainfall. This is, of course, inaccurate.

Under normal circumstances, rain will fall at many different angles relative to the vertical, depending on the direction of the wind, and the force of the wind, at any given time. In rainstorms, it is not unusual for the force and direction of the wind to change from one moment to the next, impacting the amount of water captured by the rain gauge over a period of time. Thus, the amount of water captured by a rain gauge would decrease as a result of wind factors, even though the amount of rain falling may have been reasonably steady.

SUMMARY OF THE INVENTION

According to one aspect of the invention, there is provided a rain deflector for use with a rain gauge, the rain deflector comprising: a base portion, and an arm portion having an axis and extending upwardly from the base portion, the arm portion providing an obstruction to rain falling in a direction at an angle to the axis of the arm portion and depositing the rain obstructed into the rain gauge to thereby compensate for rain which would not otherwise be captured in the rain gauge as a result of the direction of the rainfall. Attachment means may be provided whereby the deflector can be secured to the rain gauge.

In one aspect, the invention relates to a rain gauge, or an adaptor to be fitted to a rain a gauge, whereby the direction or the force of the wind will not alter to any significant degree the amount of rainwater being captured by the rain gauge. To this end, the invention preferably comprises a deflector means to be incorporated into, or adapted to fit on to, a rain gauge, whereby rainwater which would not otherwise be captured within the rain gauge is deflected by the deflector means to capture this water. Preferably, the deflector means may be a plate or vane, and may be shaped such that the more the direction of rain deviates from the vertical, the greater the surface area of the deflector means is presented to the rain. This serves to increase the amount of water captured as the direction of the rain deviates from the vertical, and provide a more accurate reading of actual rainfall. In an alternative arrangement, the deflector means may be shaped so that it always presents the same amount of surface area to the rain, whatever direction the rain may be falling, and thereby keep constant, based on actual rainfall, the amount of water entering the rain gauge.

In one aspect, the deflector means of the invention may comprise one or more fins arranged and constructed with respect to the rain gauge so as to (1) intercept rainwater, including rainwater which would otherwise miss the rain gauge, (2) deflect the rainwater, and (3) deposit it in a rain gauge tank reservoir. Preferably, the shape of the adaptor is uniquely formulated such that it compensates for the loss of rain in the rain gauge resulting from the difference between (i) the area, usually but not necessarily circular, available to collect rain in the rain gauge when the rain falls vertically and (ii) the area, usually but not necessarily elliptical, available to collect rain in the rain gauge when the rain falls at different angles relative to the vertical. The rain gauge, while often having a circular mouth or entrance, may have such a mouth of any other appropriate shape, for example, square or rectangular.

There are a vast number of possible shapes available for selection in constructing the rain gauge deflector means. Conveniently, all of these shapes will be based on the size of standard rain gauges now in use by the U.S. Weather Bureau. Such a rain gauge typically comprises a housing having a circular aperture for receiving rainwater which is about eight inches in diameter. While this may be the standard size, the application of the principles of the invention permit that the rain gauge deflector means can be adapted for any other size or shape of rain gauge, so that the angles and proportions of the deflector means would appropriately compensate for rain not captured due to external wind conditions, based on the size of the receiving aperture whether circular, rectangular or other.

In designing a rain deflector means for use with a rain gauge, the height of the actual deflector means could be very substantial. However, in practice, having a deflector means of considerable height is inconvenient, and makes construction thereof somewhat more difficult.

BRIEF DESCRIPTION OF THE DRAWINGS

FIG. 1 is a perspective view of a rain a gauge reservoir with a deflector of the invention mounted thereon;

FIG. 2 is a top view of the reservoir and deflector shown in FIG. 1;

FIGS. 3(a), 3(b) and 3(c) are schematic representations showing actual usages of the rain gauge;

FIG. 4 is a side view of a second embodiment of a rain deflector of the invention;

FIG. 5 is a schematic representation illustrating the effect of the rain gauge of the invention;

FIG. 6 is a side view of a third embodiment of a rain deflector of the invention;

FIG. 7(a) is a side view of a fourth embodiment of a rain deflector of the invention;

FIG. 7(b) is a cross-section through line A—A in FIG. 7(a);

FIG. 7(c) is a cross-section through line B—B in FIG. 7(a);

FIG. 8 is a side view of a fifth embodiment of a rain deflector of the invention;

FIG. 9(a) is a side view of a sixth embodiment of a rain deflector of the invention;

FIG. 9(b) is a top view of the of the rain deflector shown in FIG. 9(a);

FIG. 10(a) is a side view of a seventh embodiment of a rain deflector of the invention;

FIG. 10(b) is a top view of the of the rain deflector shown in FIG. 10(a);

DETAILED DESCRIPTION OF THE PREFERRED EMBODIMENTS

Figure 11:
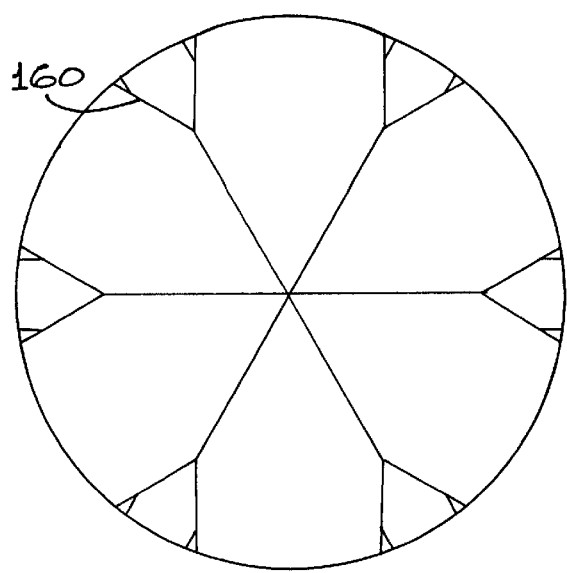
FIGS. 11, 12 and 13 are a top views of further embodiments of a rain deflector of the invention.

The invention relates to a mechanism for use as part of or in conjunction with a rain gauge for recording rainfall with greater accuracy by intercepting and collecting rain falling at an angle to the vertical, which may otherwise miss the rain gauge, in the rain gauge. The mechanism may be either an attachment to an existing rain gauge with an appropriate water catchment reservoir, or it may be a one-piece composite structure including the water reservoir tank and deflector.

In FIG. 1 of the drawings, there is shown a rain gauge 10 of the invention comprising a water reservoir 12 and a water deflector 14. The water reservoir 12 is generally of a cylindrical shape, having side walls 15 and a base 16. The gauge 10 has an upper end 18 which is open, presenting a mouth or aperture 20 through which falling rain enters the water reservoir 12 where it is held. The water reservoir 12 preferably has calibrations 22 on the outside thereof, or in any other convenient location, to facilitate easy reading, usually in inches, of the amount of rainfall.

The water reservoir 12 may be supported in any conventional manner. For example, the reservoir may be mounted on a number of posts embedded in the ground, or other suitable substrate. In other examples, the reservoir may have support feet which rest on the ground, or the flat underside of the reservoir may simply be located directly on the ground. The water reservoir would be secured to the posts or other base such that the axis thereof, indicated generally by staggered line X—X in FIG. 1, is substantially vertical. For obvious reasons, the water reservoir 12 is located in an open space where it is able to receive, unhindered, rainwater through the mouth 20.

Near the upper end 18 of the water reservoir 12, and on the inside thereof, there may, in certain embodiments, be located a shelf or lip 32. The shelf 32 is adapted to receive and hold in position the water deflector 14, as described in greater detail below. However, any suitable method of attaching the deflector 14 to the reservoir may be used, depending of course on the shape and structure of these components.

The water deflector 14 is designed to obstruct the flow path of rainwater falling at an angle other than vertical, so that the rainwater strikes the deflector 14, runs down its surface and into the water reservoir 12. The water deflector 14 comprises a base portion 34 and a vertical arm portion 36. The base portion 34 comprises a set of four angular and equispaced support posts 37 each having an outer edge 38.

The length from the outer edge 38 of one support post 37 to the outer edge 38 of an opposite support post 37 is just slightly smaller than the internal diameter of the water reservoir 12. Each outer edge 38 on a support post 37 rests on the shelf 32, thereby centering and securing the water deflector 14 with respect to the water reservoir 12. The outer edge 38, or indeed any other portion of the water deflector 14, may be bolted or otherwise secured to the shelf 32 or other part of the water reservoir 12 to strengthen the attachment of the water deflector 14 to the water reservoir 12. Alternatively, or in addition, the dimensions of the support posts 37 relative to the shelf 32 of the water reservoir 12 may have sufficiently small tolerances to ensure a tight fit of the water deflector 14 to the water reservoir 12. In any event, the water deflector 14 should be attached with sufficient secureness to the water reservoir 12 so as to be able to withstand fairly substantial vector forces produced by driving wind and rain.

The vertical arm portion 36 consists of equispaced fins 40, each fin 40 being in a location corresponding substantially to a support post 37. Four fins are shown in this embodiment, but any convenient number of such fins may be used. In fact, each fin 40 is continuous with its respective support post 37 to present an uninterrupted surface for water flow, and to contribute to the structural integrity of the water deflector 14 generally.

Each fin 40 comprises a first surface 42 and a second surface 44. The first surface 42 of one fin 40 meets a second surface 44 of an adjacent fin 40 and these two surfaces join along substantially vertical line 46.

The water deflector 14 has an upper end 48 which is rounded as shown in FIG. 1 of the drawings. While a rounded upper end is shown, this upper end may have another suitable shape.

As shown in FIGS. 1 and 2 of the drawings, each fin 40 is substantially thin walled and constructed of a strong material which will resist bending or buckling. For example, the water deflector 14, including the fins 40, may be constructed of sheet metal or a strong plastics polymer such as polyurethane. Other materials such as screen grating, fiberglass and the like may be used. The material may be coated with Teflon, a screen or other appropriate composition. The importance, in this embodiment, of the fins 40 having thin walls lies in the fact that the water deflector 14 should not present any significant obstruction to rain falling in a substantially vertical plane. Therefore, the thinner the walls comprising the fins 40, as well as the support posts 37, the less surface area of these structures will be presented to vertically falling rain, thus avoiding splashing of water to areas outside the water reservoir 12, and ultimately resulting in a reduction in the accuracy of the rain gauge 10.

FIGS. 3(a), 3(b), and 3(c) show, in diagrammatic form, the effects of the water deflector 14 of the invention. In each of these figures there is shown schematically the water reservoir 12, to which is attached a water deflector 14. The mouth 20 of the water reservoir 12 is also indicated, through which rainwater is admitted into the reservoir 12.

FIG. 3(a) illustrates schematically the situation where rainfall is substantially vertical, or parallel to the axis of the water deflector 14. In this drawing, the water deflector 14 has essentially no effect on the amount of rain entering the water reservoir 12, particularly in view of the thinness of its walls so as to present minimal surface area obstruction to the falling rain. In FIG. 3(b), the same structure is shown whereby the wind-driven rain is falling in a direction approaching approximately 45° relative to the vertical water deflector 14. While the same amount of rain may be falling as shown with respect to FIG. 3(a), less water is entering through the mouth 20 of the water reservoir 12 due to the angle of the rainfall. In this situation, the water deflector 14 presents an obstructing surface the rain, causing water to collide on the surface of the fins 40 and run down as a water stream, indicated schematically by reference numeral 50 in FIG. 3(b), through the mouth 20 and into the reservoir 12. FIG. 3(c) illustrates a similar situation, but wherein the rain is being driven by winds causing it to move in a plane almost normal to the deflector 14. Without the deflector 14, very little or no rain would enter the reservoir 12, since most of the rain is being blown over the mouth 20 of the water reservoir 12. In this instance, the deflector 14 presents an increasing surface area as an obstruction to the movement of the rain, so that the rain hits the surfaces 42 and 44 of the fins 40, and runs down by gravity as a stream of water, indicated generally by the reference numeral 52 in FIG. 3(c), through the mouth 20 and into the water reservoir 12.

The different conditions in each of FIGS. 3(a), 3(b) and 3(c) illustrate the effectiveness of the water deflector 14 in directing rain which would otherwise not be captured into the water reservoir 12 to more accurately measure the amount of rainfall.

An important feature of the present invention, clearly shown in FIGS. 3(a), 3(b), and 3(c), is to present an increasingly larger obstructive surface area to deflect rainwater into the water reservoir 12 as the angle of the rain relative to the vertical increases. In FIG. 3(a), substantially all of the rain over the mouth 20 falls into the water reservoir 12 when the rain falls vertically. At the other extreme, shown in FIG. 3(c), very little rain enters the mouth as the angle of the rain relative to the vertical water deflector 14 approaches 90°. Therefore, the water deflector 14 of the present invention, at least in one embodiment, is specifically sized and shaped so as to compensate for this reduction in the amount of rainwater entering through the mouth 20 of the reservoir 12, the amount of compensation being a function of the angle of the rain water relative to the vertical. For rainfall direction having small deviations from the vertical, very little compensation is required. On the other hand, for rainfall direction significantly deviating from the vertical, substantially all of the water entering the reservoir 12 will do so as a result of the deflector 14.

A wide variety of different shapes of deflectors may be used, and some of these are illustrated in subsequent figures. As a general rule for deflectors having a vertical arm, the vertical arm portion 36 of the water deflector 14 has a length which is a function of its width. The narrower the vertical arm, the longer it will be. Different designs and shapes may be formulated depending on the nature and conditions of the rainfall, as well as other factors, to provide a vertical arm portion 36 of a water deflector which is optimal for those conditions. It is preferable that the area of the deflector should approximate the area of the circular (or other shaped) mouth of the rain gauge. Therefore, as the deflector gets narrower, its height must increase to maintain this surface area requirement. The converse would also apply.

With reference to FIG. 4 of the drawings, there is shown, in side view, a water deflector 60 which fits over the mouth 62, shown in broken lines, of a water reservoir, not shown. The deflector 60 has a base portion 64, which can be appropriately attached to the water reservoir in any suitable manner, such as that shown with respect to FIG. 1, and a vertical arm portion 66. The vertical arm portion is fairly narrow near its lower end 68, and tapers towards a point 70 at its upper end 72. On the other hand, the base portion 64 presents a fairly broad surface area, generally designated by the numeral 74. The broad surface area 74 is particularly designed so as to capture more water when the angle of rainfall increases with respect to the vertical. As described with reference to FIGS. 3(a), 3(b) and 3(c), relatively little compensation is required when rain falls in a direction which almost parallels the vertical.

The embodiment shown in FIG. 4 shows the vertical arm portion 66 starting at its outermost end at a point 70, and presenting a wider surface area as it approaches the lower end 68 thereof. Where the angle of deviation from the vertical of the rainfall is fairly small, the surface area 74 of the base portion 64 will capture water; however, most of this water will not have evaded or missed the mouth 20 of the reservoir 12. It is only as the angle of rainfall begins to increase significantly that this surface area 74 provides an obstruction to rain, most of which may have missed the mouth 20 entirely. This effect is best illustrated in FIG. 5.

In FIG. 5, there is shown in schematic form a mouth 20 of a reservoir 12, and a deflector 60. The vertical arm portion 66 forms the upper part, which is connected to the base portion 64. An example of the direction of rain is shown by reference numeral 76. The rain strikes the base portion at point 78 and runs down the surface of the base portion in a line generally indicated by 80. However, this water indicated in line 80 would have been captured in the mouth anyway, as shown by line 82 which is an extension of line 80. Therefore, for angles of rainfall varying by no substantial amount from the vertical, the base portion 64 does not capture very much rain which would otherwise have evaded the mouth 20. Reference is now made to a second example illustrated in FIG. 5, showing direction of rain 84. This is at an angle which is greater than the angle of rain indicated by line 76. The rain represented by line 84 also strikes the base portion 64 at the point 78. The base portion 64 thus presents an obstruction to the rain, and this runs down the surface of the base portion 64, also indicated by line 80. If the base portion 64 were not there, the rain represented by line 84 would have continued beyond the point 78, as represented by line 86, and would have fallen outside the mouth 20 of the reservoir 12, and thus would not have been captured at all by the water reservoir. In this instance, therefore, appropriate compensation results to increase the accuracy of the rain gauge.

With the deflector 60 as shown in FIG. 4, and the schematic illustration in FIG. 5, it will be appreciated how the deflector of the invention is sized and structured specifically so as to provide for the appropriate compensation of "lost" rain falling at varying angles with respect to the vertical. In FIG. 5, the reference numeral 88a represents a "window" which is more or less normal to the axis of the deflector 60 and the vertical at which the rain 90a falls. This "window" 88a represents a surface area corresponding to that of the mouth 20 and over which rain must be captured in the reservoir 12. Where the rain is falling at an angle, the "window" will not continue to capture the same amount of rain, and the purpose of the deflector is therefore to have the effect of tilting the "window", indicated by reference numeral 88b, so as to be normal to the direction of the rain 90b, Such considerations would be taken into account in designing the shape and size of the deflector 60 in this particular embodiment.

Reference is now made to FIG. 6 of the drawings which shows a side view of yet another embodiment of the deflector of the invention. In this FIG. 6, a deflector 96 is shown having a base portion 98 and a vertical arm portion 100. As shown with respect to FIG. 4, the deflector 96 fits over the mouth 102 of a water reservoir for a rain gauge, and may be attached to the reservoir in any suitable manner, for example as shown with reference to FIG. 1 of the drawings. The embodiment shown in FIG. 6 is somewhat similar in size and shape to that shown in FIG. 4, except that the vertical arm portion 100 in the deflector of FIG. 6 is of constant width over substantially its entire length. It should also be noted that the base 98 has a surface area 104 which is preferably designed so as to be approximately equal to the area of the mouth of the rain gauge 12. With the surface area 104 being approximately equal to the area of the mouth 102, it can be seen that, when the direction of the rain is theoretically horizontal, or at 90° to the vertical, this surface area 104 presents an obstruction of substantially equal size to that of the mouth, and intercepts and enables the rain gauge to capture an amount of water commensurate to the rainfall, and therefore provide a more accurate reading.

When the rain falls vertically, the obstruction provided by the deflector 96 is close to zero. When the rainfall is theoretically horizontal, the surface area presented as an obstruction is more or less equivalent to the surface area of the mouth 102. Between these two extremes, and as the rain increasingly deviates from the vertical, a greater area of the deflector 96 will increasingly present an obstruction to compensate for rain lost due to the changing direction of the rainfall. The deflector of the invention is constructed such that its dimensions and shape are calculated precisely to compensate for lost rainfall as the angle of rainfall changes.

Turning to FIG. 7, there is shown a further embodiment of the invention. FIG. 7(a) is a side view of a substantially solid deflector 110 having a base portion 112 and an upper portion 114. The base portion 112 is relatively large compared to the upper portion 114, and the base portion 112 approximates the surface area of the mouth of the rain gauge. The deflector 110 has a number of folds or bends 116 which produce on the surface of the deflector 110 a series of channels or grooves 118. Rain captured by the impact of the rainwater on the deflector 110 flows through the channels 118 and is deposited in the rain gauge. FIG. 7(b) shows a cross-section through lines A—A of FIG. 7(a) providing a plan view of the folds 116 showing the intermediate channels 118 therebetween. FIG. 7(c) shows a cross-section through B—B of FIG. 7(a), at this point showing the base portion 112.

FIG. 8 shows yet a further embodiment wherein the deflector 124 is more or less conical shaped, comprising a solid body having a base portion 126 which fits over the rain gauge and an uppermost portion 128. The surface of the deflector 124 approximates a porous screen, down which rainfall captured by the deflector runs for deposit into the rain gauge.

In FIG. 9(a), there is shown a very different embodiment of the invention. In this particular embodiment, the deflector 130 comprises a substantially spherically shaped body having arranged on its surface a plurality of substantially longitudinal, equispaced fins 132. FIG. 9(b) is a top view of the deflector 130 shown in FIG. 9(a). In FIG. 9(a), there is shown a window 134 representing the surface area of rain that will be captured, when falling in a vertical direction, and a window 136, having a surface area corresponding to rainfall captured by the deflector 130 when rain falls at an angle to the vertical. The advantage of the spherically shaped body 130 is, of course, that the windows 134 and 136 have substantially the same surface area, showing that, whatever the direction of the rainfall, the deflector 130 presents the same surface area for intercepting and capturing rainfall. The water impacting the deflector 130 will flow through grooves or channels 138, and in this embodiment may flow alongside or into a measuring tube 140 which will provide an indication of the amount of rain collected.

FIG. 10(a) also shows a spherical shaped deflector 144 comprising a central post 146 and extending therefrom a series of slightly upwardly directed platforms 148. The platforms have smaller diameters near the top 150 and the bottom 152 of the deflector 144 and have increasing diameters as the platforms approach the center or "equator" of the deflector 144. The central post 146 may have apertures therein for receiving water collected on each platform, so that water flows down each platform towards the central core, enters the core and flows down through a measuring tube 154. FIG. 10(b) shows a top view of the deflector 144 illustrated in FIG. 10(a) of the drawings.

Figure 12:
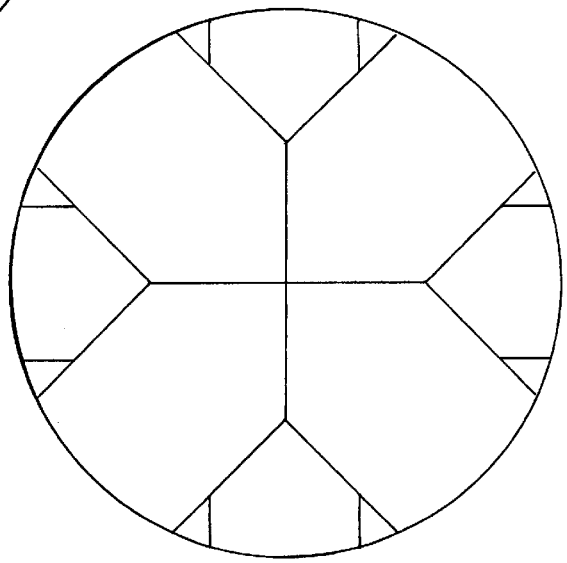
Figure 13:
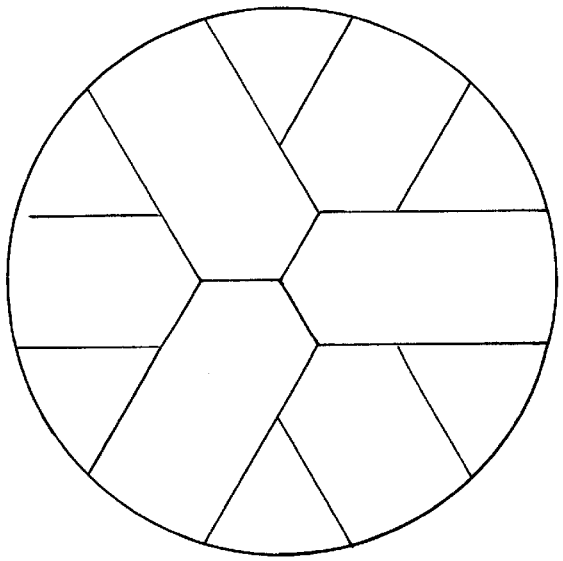

FIGS. 11, 12 and 13 show top views of various deflectors. FIG. 11 shows a series of six fins 160 equispaced about the axis of the deflector. FIG. 12 shows an arrangement, whereby eight fins are located about the axis of the deflector. Finally, in FIG. 13, yet another arrangement of fins is shown, with two pairs of three fins each, for capturing rainwater. The deflectors shown in FIGS. 11, 12 and 13 may have a shape and form shown in some of the earlier Figures, such as in FIGS. 1 and 6.

Figure 14:
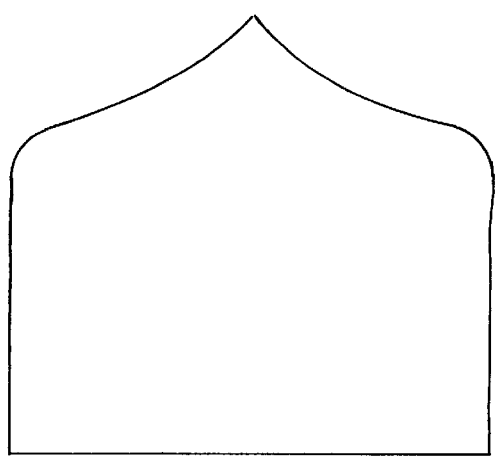
FIG. 14 is a side view of a further embodiment of the rain deflector of the invention.

FIG. 14 shows a further embodiment of the invention where the rain deflector includes a base portion comprised of a plurality of fins, and a shortened upwardly extending arm portion terminating in a point. The base portion and arm portion define a plurality of fins, in this embodiment four fins, about the central axis of the deflector. As with other embodiments shown in this application, the base portion attaches to or fits over a rain gauge.

Specific examples of measurement and dimensions of deflectors falling within the scope of this invention are now set out.

| Radius = 4 Pi = 3.1415926 | | |
|---|---|---|
| Angle | Area | Residue |
| 0 | 50.27 | 00.00 |
| 5 | 50.07 | 00.19 |
| 10 | 49.50 | 00.76 |
| 15 | 48.55 | 1.71 |
| 20 | 47.23 | 3.03 |
| 25 | 45.56 | 4.71 |
| 30 | 43.53 | 6.73 |
| 35 | 41.18 | 9.09 |
| 40 | 38.51 | 11.76 |
| 45 | 35.54 | 14.72 |
| 50 | 32.31 | 17.96 |
| 55 | 28.83 | 21.43 |
| 60 | 25.13 | 25.13 |
| 65 | 21.24 | 29.02 |
| 70 | 17.19 | 33.07 |
| 75 | 13.01 | 37.26 |
| 80 | 8.73 | 41.54 |
| 85 | 4.38 | 45.88 |
| 90 | 0.00 | 50.27 |

In the Table above, the "Angle" is measured from the vertical datum at 5° increments with 0° being vertical and 90° being horizontal. Note, however, that increments of 1° or less may be used in the design of deflectors.

The "Area" is the area of the rain gauge that actually accepts rain at the given angle. At anything other than 0° (area of circle), this area represents the area of an ellipse.

The "Residue" is the difference between the above area and the area at 0 (area of circle). This is the area which is being deflected or intercepted.

The invention is not limited to the precise constructional details set out above. As mentioned, the deflector may assume a wide variety of shapes and sizes, and provided the deflector approximately or precisely compensates for loss of water collected in the reservoir due to the change of angle of rainfall, the deflector will fall within the scope of the invention. Further, various forms of reservoirs may be used. In this specification, a typical conical shaped reservoir is mentioned, and a cylindrical shaped reservoir described and illustrated in some detail, but other convenient shapes which may be suited to specific purposes fall within the scope of the invention. Various forms of attachment between the deflector and the reservoir may also be provided. The object is to locate the deflector relative to the reservoir to catch appropriate amounts of water for providing an accurate rain gauge, and the attachment should be sufficiently strong so as to resist wind and rain forces which would normally be encountered in the circumstances.

I claim:

1. A rain deflector for use with a rain gauge, the rain deflector comprising: a base portion, and at least one arm portion having an axis and extending upwardly from the base portion, the arm portion and the base portion providing an obstruction to rain falling in a direction at an angle to the axis of the arm portion and depositing the rain obstructed into the rain gauge.

2. A deflector as claimed in claim 1 wherein the arm portion is an elongate body extending upwardly from the base portion.

3. A deflector as claimed in claim 1 wherein two or more arm portions are provided on the base portion and extend upwardly therefrom.

4. A deflector as claimed in claim 1 wherein the arm portion is an elongate member having an axis, with a plurality of fins extending radially from the axis.

5. A deflector as claimed in claim 4 wherein each fin has walls which are of sufficiently small thickness so as to present a minimal obstruction to rainfall the direction of which is substantially parallel to the axis of the arm portion.

6. A deflector as claimed in claim 4 wherein four equispaced fins are provided about the axis of the arm portion.

7. A deflector as claimed in claim 1 wherein the arm portion is an elongate body and has an axial length more than ten times the width thereof.

8. A deflector as claimed in claim 1 wherein the arm portion tapers from a widened area near the base portion to a point at its end remote from the base portion.

9. A deflector as claimed in claim 1 wherein the base portion has a surface area substantially the same as that of a mouth of a rain gauge to which the rain gauge deflector is attached.

10. A deflector as claimed in claim 1 wherein the base portion and the arm portion together have a surface area substantially the same as that of a mouth of a rain gauge to which the rain gauge deflector is attached.

11. A deflector as claimed in claim 1 wherein the base portion includes a plurality of equispaced supports about the axis, each support having a foot which comprises an attachment means for securing the deflector to the rain gauge.

12. A deflector as claimed in claim 1 wherein the deflector is comprised of a plastics material.

13. A deflector as claimed in claim 1 wherein the deflector is comprised of a sheet metal material.

14. A deflector as claimed in claim 1 wherein the deflector is comprised of a fiberglass material.

15. A deflector as claimed in claim 1 further comprising attachment means whereby the deflector can be secured to a rain gauge.

16. A rain deflector for use with a rain gauge, the rain deflector comprising a substantially spherically shaped water collection member having an outer surface for providing an obstruction to rain falling over or about the rain gauge, and water retention means on the collection member for retaining the water obstructed, the water retention means comprising a plurality of spaced-apart platforms extending radially outwardly from a central core, each platform having an inner edge attached to the core and an outer edge, the radius of each of the platforms varying such that the outer edges of the platforms define concentric circles about the core, the concentric circles forming the outer surface of the collection member, the water retention means depositing the water collected by the collection member into the rain gauge.

17. A rain deflector as claimed in claim 16 wherein the water retention means comprises a plurality of channels in the outer surface of the collection member.

18. A deflector as claimed in claim 17 wherein the channels are formed by a plurality of equispaced, longitudinally extending projections on the outer surface, a pair of projections defining therebetween a channel.

19. A deflector as claimed in claim 17 further comprising a tube member at a lower end of the collection member for receiving water from the channels.

20. A deflector as claimed in claim 16 wherein the platforms are angled relative to the horizontal so that water collected runs down the platforms towards the core.

21. A deflector as claimed in claim 16 wherein the core is hollow and comprises apertures therein for receiving water collected on the platforms.

22. A rain deflector for use with a rain gauge, the rain deflector comprising a plurality of spaced apart platforms extending radially outwardly from a central core, each platform having an inner edge attached to the core and an outer edge, the radius of each of the platforms varying such that the outer edges of the platforms define concentric circles about the core, the concentric circles forming a spherical shape.

* * * * *